United States Patent [19]

Brown et al.

[11] Patent Number: 5,217,679

[45] Date of Patent: Jun. 8, 1993

[54] DEVICE FOR RESTRICTING THE MOTION OF A THIMBLE TUBE INSIDE A NUCLEAR REACTOR

[75] Inventors: Steve K. Brown; Gary S. Carter; James E. McCann, all of Lynchburg, Va.

[73] Assignee: B&W Nuclear Service Company, Lynchburg, Va.

[21] Appl. No.: 867,556

[22] Filed: Apr. 13, 1992

[51] Int. Cl.⁵ .............................................. G21C 17/00
[52] U.S. Cl. .................................... 376/277; 376/254; 376/285
[58] Field of Search ............... 376/254, 285, 286, 292, 376/277, 463; 976/DIG. 238, DIG. 174

[56] References Cited

U.S. PATENT DOCUMENTS

| | | | |
|---|---|---|---|
| 4,751,039 | 6/1988 | Delevallee et al. | 376/254 |
| 4,765,944 | 8/1988 | Heuze et al. | 376/254 |
| 4,778,647 | 10/1988 | Gasparro | 376/254 |
| 4,933,137 | 6/1990 | Murakami et al. | 376/254 |
| 4,975,241 | 12/1990 | Haslinger et al. | 376/254 |
| 4,990,304 | 2/1991 | Rylatt | 376/254 |
| 5,120,491 | 6/1992 | Brown et al. | 376/254 |

*Primary Examiner*—Daniel D. Wasil
*Attorney, Agent, or Firm*—Robert J. Edwards; D. Neil LaHaye

[57] ABSTRACT

A device for restricting the motion of a thimble tube in a nuclear reactor during normal reactor operating conditions. A cylindrical sleeve open at each end has upper, middle, and lower sections. The upper section has an over-expanded area adjacent the top end to aid in proper positioning in the lower core support plate. The middle section is formed from inner and outer sections attached at their ends and formed from material having different coefficients of thermal expansion. The inner portion of the middle section moves from a first normal relaxed state during cold conditions in the reactor to a second flexed state during hot conditions in the reactor to provide a clamping action on the thimble tube received by the sleeve. A baffle in the lower section reduces coolant flow velocity and pressure through the sleeve.

3 Claims, 1 Drawing Sheet

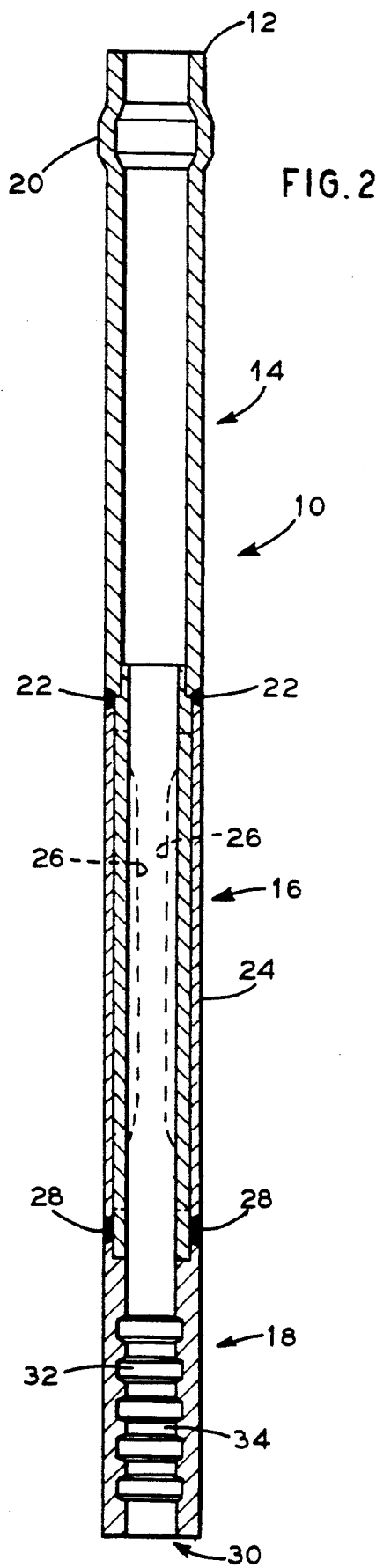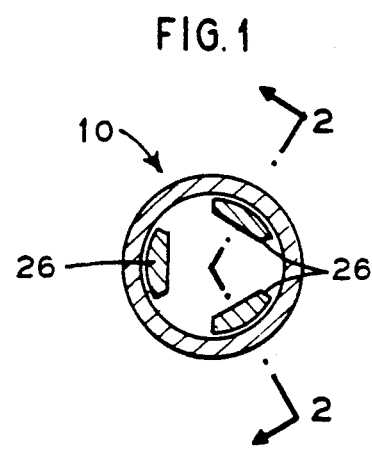

DEVICE FOR RESTRICTING THE MOTION OF A THIMBLE TUBE INSIDE A NUCLEAR REACTOR

BACKGROUND OF THE INVENTION

1. Field of the Invention

The present invention is generally related to nuclear reactor fuel assemblies and in particular to a thimble tube sleeve for reducing thimble tube wear.

2. General Background

Operating experience with typical unmodified and early model Westinghouse and Framatome/EDF nuclear reactors has shown that a high maintenance and wear problem exists in the guide path for the nuclear instrument thimble tubes which contain nuclear instruments and leads. The thimble tubes are guided into the inside diameter of the fuel assembly instrument sheath (tube) through guide paths located inside column structures that are integral parts of the reactor lower internals. The wear problem on the thimble tubes is attributable to the high velocity coolant flow along the length of the thimble tubes. The high velocity flow causes the thimble tubes to vibrate. The vibrating contact of thimble tubes against the lower core support plate, through which the thimble tubes pass, causes rapid and excessive wear of the thimble tubes. A known approach to alleviate the problem is the addition of sleeves anywhere from 30 to over 50 inches in length to house the thimble tubes above and below the core support plate. Although this has been somewhat effective in mitigating the flow-induced vibration, there still exists a need for a more effective means of further reducing or preventing flow-induced vibration of the thimble tubes.

SUMMARY OF THE INVENTION

The present invention addresses the above need in a straightforward manner. What is provided is an apparatus for restricting the motion of a thimble tube inside a nuclear reactor. A cylindrical sleeve open at each end has upper, middle, and lower sections. The middle section is formed from two materials joined together that have different coefficients of thermal expansion. This allows insertion or removal of the thimble tube during cold conditions. During hot conditions in the reactor the inner material constricts radially against the thimble tube inside the sleeve. The lower section is provided with a labyrinth or baffle that serves to reduce the velocity of the coolant flow through the sleeve. The upper section of the sleeve extends above the lower core support plate in the reactor.

BRIEF DESCRIPTION OF THE DRAWINGS

For a further understanding of the nature and objects of the present invention reference should be had to the following description taken in conjunction with the accompanying drawings in which like parts are given like reference numerals, and wherein:

FIG. 1 is a cross sectional view of the invention.

FIG. 2 is a side sectional view of the invention taken along lines 2—2 of FIG. 1.

DETAILED DESCRIPTION OF THE PREFERRED EMBODIMENT

Referring to the drawings, it is seen in FIG. 2 that the invention is generally indicated by the numeral 10. Device 10 is generally comprised of cylindrical sleeve 12 having upper, middle, and lower sections 14, 16, 18 respectively. The outer diameter of sleeve 12 is sized to be received through an existing bore in the lower core support plate of a nuclear reactor. The inner diameter is sized to receive a thimble tube during cold conditions in the nuclear reactor.

Upper section 14 is formed from any material suitable for such use inside a nuclear reactor. 316L stainless steel is used in the preferred embodiment partly because a hard roll expansion of the invention in this area will be used to lock it in position inside the reactor internals. Over-expanded area 20 is provided slightly below the top end of upper section 14. The outer diameter of area 20 is sized to be slightly larger than the internal diameter of the bore in the lower core support plate into which device 10 is installed. This feature prevents inadvertent misalignment of device 10 inside the lower internals instrument guide tube. The expanded area also helps with accurate positioning of the device by preventing it from being installed at an improper elevation. The return to the normal internal diameter above expanded area 20 provides better coolant flow excitation dynamics for the thimble tube(s). Flow testing has confirmed that a flared top end results in a disruption of coolant flow and causes more thimble tube vibration than the illustrated design. Upper section 14 is welded to middle section 16 as indicated at numeral 22.

Middle section 16 is comprised of outer section 24 and inner section 26. Outer and inner sections 24, 26 are welded to each other at their top ends at weld 22 and at their lower ends at each of several plug welds 28. Outer and inner sections 24, 26 are formed from materials having different coefficients of thermal expansion. The materials used are selected and attached to each other such that inner section 26 is in a first normal relaxed state during cold conditions in the reactor but during hot conditions in the reactor (normal operating temperature) inner section 26 moves from its first relaxed state to a second flexed state, thus providing middle section 16 with a variable inner diameter. When inner section 26 is in the first relaxed state, the internal diameter of middle section 16 will readily receive a thimble tube. When inner section 26 is in the second flexed state, the internal diameter of middle section 16 is effectively reduced by inner section 26. This results in a preload or clamping action by inner section 26 on the thimble tube therein. This delivers a significant dampening effect to the thimble tube in preventing vibration caused by coolant flow. As seen in phantom view in FIG. 2, the greatest area of internal diameter reduction is in the area of the center of inner section 26 due to the attachment points being only at the ends. In the preferred embodiment, as best seen in FIG. 1, inner section 26 is comprised of three separate bars equally spaced around the inner circumference of outer section 24. Although a different number of bars can be used for inner section 26, three are used in the preferred embodiment to obtain the clamping action on three opposing sides of the thimble tube. In the preferred embodiment, inner section 26 is formed from cold worked 316L stainless steel and outer section 24 is formed from inconel ®.

Lower section 18 may be integral with middle section 16. In the preferred embodiment, lower section 18 is formed from the same, continuous material used to form middle section 16. Lower section 18 may also be a separate part attached to middle section 16 at weld 28. Lower section 18 is provided with baffle 30 along its inner diameter. Baffle 30 sets up effective areas of coolant flow restriction. This reduces coolant flow velocity and pressure upstream of baffle 30, that is, through middle and upper section 16, 14. This maintains cooling requirements while reducing the potential for causing thimble tube vibration. Baffle 30 is formed from a plurality of alternating rings 32, 34. Rings 32 have an outer diameter slightly larger than the interior diameter of lower section 18 and are received in circumferential grooves on the inner surface of lower section 18. Rings 34 have an outer diameter substantially equal to that of lower section 18. The inner diameter of rings 34 is less than that of rings 32 but still large enough to allow a thimble tube therethrough. The changing inner and outer diameter between rings 32, 34 serves to reduce coolant flow and pressure.

In operation, device 10 is installed in the lower core support plate of a nuclear reactor during a scheduled outage. Over-expanded area 20 prevents device 10 from being positioned too low in the reactor. A thimble tube is received through device 10 while the reactor is in a cold condition and inner section 26 in its first normal relaxed state. When reactor operations are started, the temperature rise causes inner section 26 to move to its second flexed state in which it provides a clamping action on the thimble tube. Baffle 30 reduces the velocity and pressure of coolant flow through device 10 to further aid in preventing vibration and excessive wear of the thimble tube.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A device for restricting the motion of a thimble tube in a nuclear reactor during normal reactor operating conditions, comprising:
   a. a sleeve open at each end and having upper, middle, and lower sections; and
   b. said middle section having inner and outer sections attached to each other at their ends and being formed from materials having different coefficients of thermal expansion whereby the inner section is in a first normal relaxed state during cold conditions in the reactor and in a second flexed state during hot conditions in the reactor.

2. The device of claim 1, wherein said upper section has an over-expanded area adjacent the top end.

3. The device of claim 1, further comprising a baffle in said lower section.

* * * * *